United States Patent [19]

Anderson

[11] Patent Number: 4,702,532

[45] Date of Patent: Oct. 27, 1987

[54] HYDRAULIC ANTI-SKID BRAKING SYSTEMS FOR VEHICLES

[75] Inventor: Robert A. Anderson, Solihull, England

[73] Assignee: Lucas Industries Public Limited Company, England

[21] Appl. No.: 835,472

[22] Filed: Mar. 3, 1986

[30] Foreign Application Priority Data

Mar. 23, 1985 [GB] United Kingdom ............... 8507620

[51] Int. Cl.[4] ........................... B60T 8/42; F16K 1/00
[52] U.S. Cl. ................................... 303/115; 303/116; 188/352
[58] Field of Search ............... 303/116, 115, 113, 117, 303/119, 61–63, 68–69; 188/352; 60/453, 584; 251/321; 137/625.25

[56] References Cited

U.S. PATENT DOCUMENTS

| 4,181,370 | 1/1980 | Noeami et al. ............... 188/352 X |
| 4,318,460 | 3/1982 | Kosinski ........................... 188/352 |
| 4,340,258 | 7/1982 | Farr ................................. 303/116 X |
| 4,401,348 | 8/1983 | Farr .................................... 303/116 |
| 4,428,624 | 1/1984 | Farr .................................... 303/116 |
| 4,474,413 | 10/1984 | Farr .................................... 303/116 |
| 4,648,664 | 3/1987 | Yardley ............................... 303/115 |
| 4,655,513 | 4/1987 | Farr ................................. 303/116 X |

FOREIGN PATENT DOCUMENTS

| 2029914 | 3/1980 | United Kingdom . |
| 2069640 | 8/1981 | United Kingdom . |
| 2155574 | 9/1985 | United Kingdom . |

Primary Examiner—Douglas C. Butler
Attorney, Agent, or Firm—Laff, Whitesel, Conte & Saret

[57] ABSTRACT

In an hydraulic anti-skid braking system of the pump and de-boost type, the de-boost piston is held in an advanced inoperative position by a volume of fluid trapped in a space and supplied by a pump. A bleed device communicating with the space is held in an open position during initial bleeding of the system by a friction device which acts as a stop and which is releasable when the bleed device is subjected to a predetermined pressure. This enables initial bleeding to be carried out automatically and without an operator operation to open and close a bleed device. The device comprises a pressure-responsive detent which is located in a radial bore in the housing and has a releasable engagement at its inner end in a groove in a spool which comprises the bleed device.

6 Claims, 3 Drawing Figures

HYDRAULIC ANTI-SKID BRAKING SYSTEMS FOR VEHICLES

This invention relates to hydraulic anti-skid braking systems for vehicles of the kind in which a supply of operating fluid from a supply to a vehicle brake is modulated by a modulator assembly in accordance with skid signals from skid sensing means, and an hydraulic pump incorporating at least one plunger working in a bore has a working chamber which is in communication with the modulator assembly to control brake re-application following skid correction.

In the anti-skid braking systems described in GB-A-2029914 and GB-A-2069640 the modulator assembly comprises a bore in which works a de-boost piston for co-operation with a control valve assembly adapted to control communication between the supply of operating fluid and the brake through an expansion chamber defined in the bore between the piston and the control valve assembly. Normally the piston is held in an inoperative advanced position by a trapped volume of fluid supplied by the pump and, in this position, the valve assembly is fully open and the effective volume of the expansion chamber is at a minimum. When a skid signal is produced the trapped volume of fluid is released which permits the piston to move into a retracted position, initially to permit the valve assembly to close and isolate the supply from the brake, and subsequently to increase further the effective volume of the expansion chamber, whereby to relieve the brake-applying pressure. Following correction of the skid, the pressure from the pump is operative to urge the piston towards its advanced position, initially to re-apply the brake by pressurising the fluid in the expansion chamber, and subsequently opening the valve assembly to re-establish communication between the supply and the brake.

It is a problem in anti-skid braking systems of the kind set forth, such as the systems of GB-A-2029914 and GB-A-2069640, to ensure that initial bleeding of the system on assembly of the system on the vehicle can be carried out automatically and without an operator operation to open and close a bleed device. In addition it is also desirable to ensure that when the pump, and in particular the trapped volume of fluid supplied by the pump to support the piston in the advanced position, is bled, there is no danger of the bleed device remaining accidentally in an open position. This would cause loss of fluid from the system and consequent closure of the control valve assembly, ultimately rendering the pump inoperative.

In our GB Patent publication No. 2,155,574 we have disclosed an hydraulic braking system of the kind set forth in which the modulator assembly comprises a bore in which works a de-boost piston for co-operation with a control valve assembly adapted to control communication between the supply of operating fluid in the bore between the piston and the control valve assembly, and the piston is held in an advanced inoperative position by a volume of fluid trapped in a space to which the fluid is supplied by the pump, a bleed device communicates with the space, friction means being provided for holding the bleed device in an open position during initial bleeding of the system, and the bleed device being adapted to close automatically when a fluid pressure to which it is subjected attains a predetermined value sufficient to overcome the friction means.

The provision of the friction means enables us, when assembling the modulator, to arrange the bleed device in the open position so that initial bleeding of the system on assembly of the system on the vehicle can be carried out automatically and without an operator operation to open and close a bleed device.

In the specific construction disclosed in GB No. 2155574 the bleed device comprises a spool working in a bore in a housing and movable between a first bleed position in which ports in the wall of the bore are in communication and a second closed position in which communication between the ports is cut-off, the friction means comprising a resilient locking member which acts between the bore and the spool, the locking member being located in a first position during initial assembly of the modulator assembly in which it acts as a releasable stop to hold the spool in the first bleed position, whereby initial bleeding of the system can take place, the force of the locking member being overcome to release the stop when a force comprising the pressure in the space acting on a pressure-responsive face on the spool attains a predetermined value, whereafter the locking member is carried by the spool into a second position as the spool is urged from the first bleed position into its second position, the locking member thereafter remaining in the said second position.

We have found that the tolerances between the bore, the spool, and the resilient locking member are critical to ensure that the spool is able to move automatically into the second position when the pressure in the space attains the predetermined value.

According to our present invention in an hydraulic braking system of the kind set forth the modulator assembly comprises a housing having a bore in which works a de-boost piston for co-operation with a control valve assembly adapted to control communication between the supply of operating fluid and the brake, and the piston is held in an advanced inoperative position by the volume of fluid trapped in a space to which the fluid is supplied by the pump, a bleed device communicates with the space, friction means being provided for holding the bleed device in an open position during initial bleeding of the system, and the bleed device being adapted to close automatically when a fluid pressure to which it is subjected attains a predetermined value sufficient to overcome the friction means, the friction means comprising a pressure-responsive detent responsive to fluid pressure in the space and movable between an initial advanced position to hold the bleed device in the open position and an inoperative retracted position which permits the bleed device to close automatically when the pressure attains the said predetermined value, the detent being held in its advanced position by frictional engagements with the housing and the bleed device, which frictional engagements are overcome by the force on the detent due to the pressure acting over a pressure-responsive face on the detent.

Preferably the bleed device comprises a spool working in a bore in the housing and movable between a first bleed position in which ports in the wall of the bore are in communication and a second closed position in which communication between the ports is cut-off, the pressure-responsive detent comprising a piston working in a second bore in the housing normal to the bore in which the spool works and carrying a stem of which the free end is received in a complementary notch in the spool to hold the spool in the first bleed position and from which the stem is releasable as the detent moves into its retracted position.

This facilitates construction since the tolerances between the piston, the housing, and the bleed device do not have to be held within critical limits.

Preferably the stem has an inclined portion at its free end which co-operates with a complementary inclined face at the inner end of the notch, whereby to provide a wedge action and facilitate withdrawal of the stem against the frictional engagement between the inclined face and the notch.

The notch preferably comprises a radial groove in the spool, and the piston may be retained in its bore against accidental removal by a cover plate of the dump valve.

One embodiment of our invention is illustrated in the accompanying drawings in which.

Figure 1:
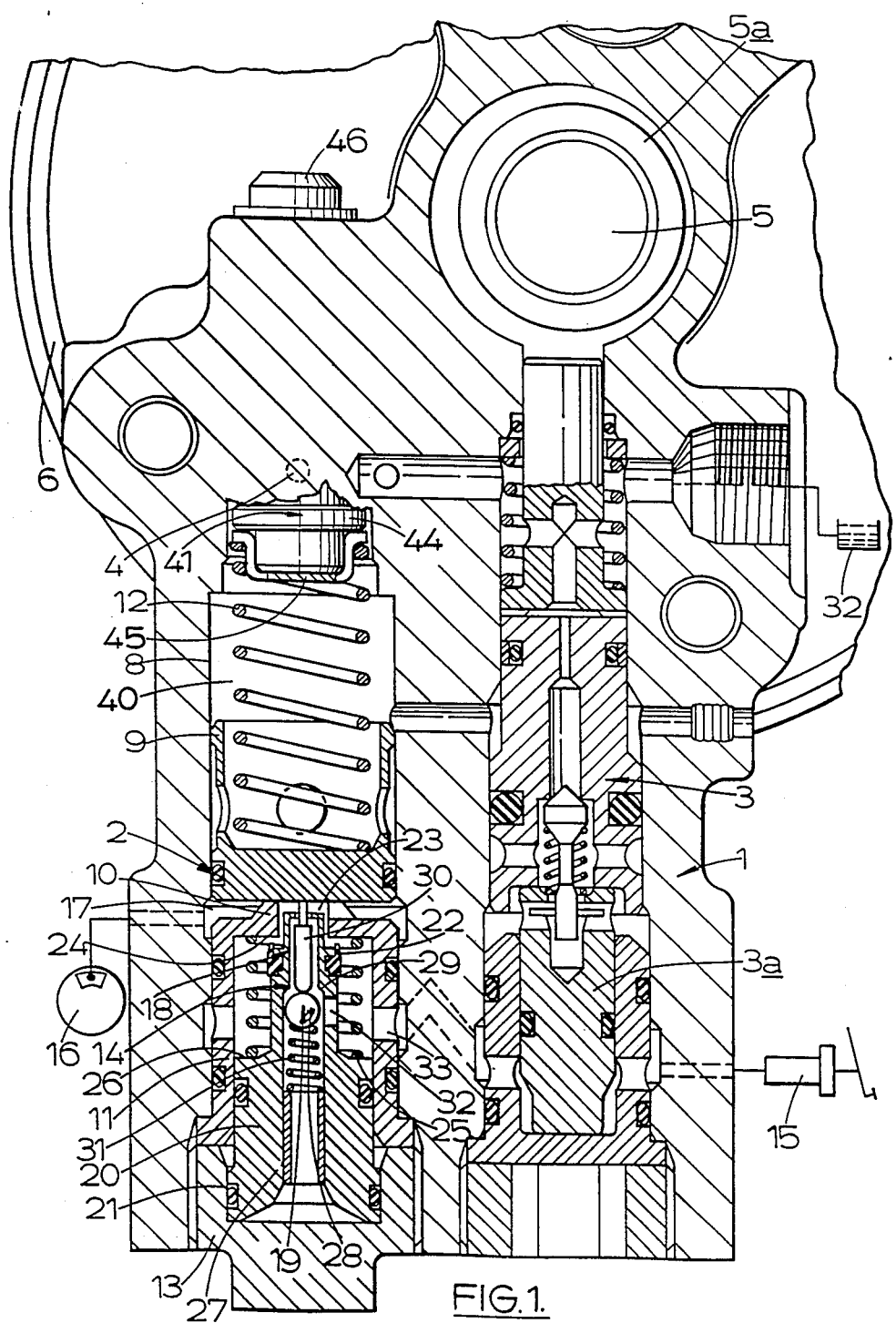
FIG. 1 is a transverse section through a combined modulator and skid sensing assembly for an hydraulic anti-skid braking system suitable for a motor-cycle or light passenger car or van.

The assembly illustrated in the drawing comprises a housing 1 incorporating a modulator assembly 2, an hydraulic pump assembly 3, and a pressure dump valve 4. A longitudinally extending shaft 5 projecting at opposite ends through the housing 1 is coupled at one end to a wheel to be braked and at the other end carries skid sensing means (not shown) which is enclosed within a cylindrical guard 6 carried from an adjacent end of the housing 1.

The dump valve 4 and the skid sensing means may be of any of the forms disclosed in GB-A-2029914, and the pump assembly 3 forms the subject of GB-A-2069640. These mechanisms need not be described further herein except to mention that the pump 3 is urged in one direction by an eccentric 5a on the shaft 5 and in the opposite direction by pressure from a pedal-operated master cylinder 15 which acts over an operating piston 3a.

The modulator assembly 2 comprises a bore 8 extending from the dump valve 4 and in which works a de-boost piston 9. The piston 9 is normally urged into an inoperative position against a stop comprising a wall 10 at the closed end of a sleeve 11 substantially of cup-shaped outline by means of a spring 12, and the sleeve 11 is retained in the bore 8 by means of a closure 13 for the end of the bore 8 remote from the dump valve 4.

A control valve assembly 14 housed in the sleeve 11 controls communication between the pedal-operated master cylinder 15 and a wheel brake 16 through an expansion chamber 17 defined in the bore 8 between the piston 9 and the control valve assembly 14 itself.

The control valve assembly 14 comprises a first valve 18, and a second valve 19 which are operative sequentially.

The first valve 18 comprises a first valve member 20 in the form of a stepped piston having a portion of intermediate diameter working in the bore of the sleeve 11, an outer portion of largest diameter working in a blind bore 21 of the closure 13, an inner portion of smaller diameter carrying an annular seal 22 which defines a valve head, and an innermost portion of smallest diameter which projects into a circular opening 23 in the wall 10. The valve head 22 is engageable with a seating 24 comprising an annulus on the wall 10 which surrounds the opening. Normally the head 22 is spaced from the seating 24 by means of a spring 25 which acts between the wall 10 and a shoulder 26 at the step in diameter between the intermediate and the smaller diameter portions of the piston 20.

The piston 20 has an open-ended longitudinally extending bore 27 of stepped outline in which the second valve 19 is housed. The second valve 19 comprises a valve member 28 in the form of a ball which is engageable with a seating 29 defined by a shoulder at the step in diameter of the bore 27. The ball 28 is normally urged away from the seating 29 by a probe 30 with which the piston 9 co-operates against the force in a light compression spring 31.

In the normal inoperative position shown in the drawing the dump valve 4 is closed so that the piston 9 is held in an inoperative advanced position in which the second valve 19 is held open by the probe 30, and the first valve is held open by the spring 25.

When the brake is to be applied by operation of the master cylinder 15, hydraulic fluid is supplied to the brake through radial ports 33 in the wall of the sleeve 11, and through the open first valve 18 to the expansion chamber 17. Simultaneously fluid also enters the through-bore 27 through a port 32 in the wall of the piston 20 and can pass to the expansion chamber through the open second valve 19. Thus there is a substantially unrestricted flow of fluid to the brake.

Fluid from the master cylinder acts on the shoulder 26 at the step in diameter, over the valve head 22, and over the outer end of the piston 20 which is of greatest area. The unrestricted communication continues until the pressure from the master cylinder 15 attains a predetermined value such that the force acting on the piston 20 due to the pressure acting over the end of greatest area overcomes the force in the spring 25 plus the force due to that pressure acting over the shoulder 26 and the head 22. The first valve 18 then closes, and any further pressure increase can only take place at a reduced rate by flow through a restricted path comprising the clearance between the valve member 28 and the seating 29.

When a skid signal is received the dump valve 4 opens to release the volume of fluid trapped in the bore 8 so that the piston 9 can retract against the force in the spring 12 initially to allow the second valve 19 to close since the pressure at which a skid signal can be emitted is higher than that at which the first valve 18 will have closed. This cuts-off communication between the master cylinder 15 and the brake 16, and the retraction of the piston 9 continues to increase the effective volume of the expansion chamber 17, whereby to relieve the pressure applied to the brake 16.

Opening the dump valve 4 also unbalances the pump 3 causing it to pump fluid in a closed circuit into the bore 8 from a reservoir 32 to which it is returned, through the dump valve 4. Since communication between the piston 3a and the master cylinder 15 is unrestricted, the pump 3 can move freely.

At the termination of the skid signal the dump valve 4 closes to isolate the bore 8 from the reservoir 32 and the pump 3 is then operative to increase the pressure in the bore 8, with the result that the piston 9 is urged towards its inoperative, retracted, position. Initial movement of the piston 9 in this direction re-applies the brake 16 by pressurising the volume of fluid trapped in the expansion chamber 17, and subsequent movement opens the second valve 19 to establish a restricted flow from the master cylinder to the expansion chamber 17 through the clearance between the ball 28 and the seating 29. Thus the first valve 18 closes at a predetermined pressure independent of the movement of the piston 9.

The second valve 19 is closed and opened by movement of the piston 9 away from and towards its stop 10 on the sleeve 11. When the pressure from the master cylinder 15 is reduced below a predetermined value, the first valve 18 reopens to provide a free and unrestricted communication between the master cylinder 15 and the brake 16.

Figure 2:
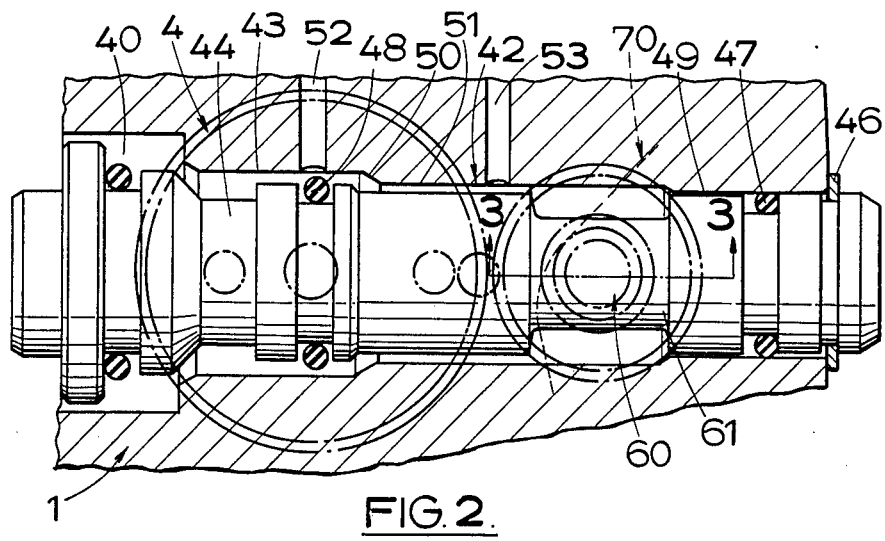
FIG. 2 is a longitudinal section through a bleed device.
Figure 3:
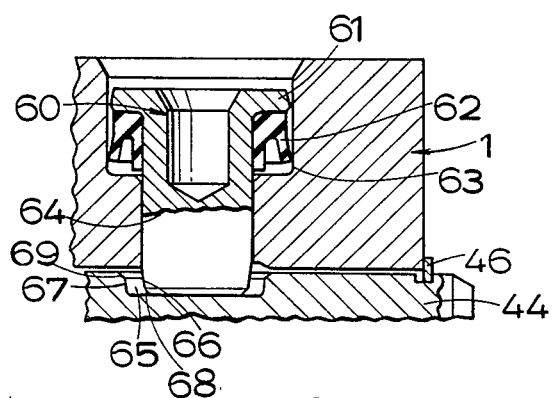
FIG. 3 is a section on the line 3—3 of FIG. 2.

Bleeding of the space 40 in which fluid is trapped and which acts normally to hold the piston 9 in the advanced position is achieved by operation of a bleed device 41 shown in detail in FIGS. 2 and 3 of the drawings.

As shown in FIG. 2 the housing 1 is provided with a stepped bore 42 of which the inner end portion 43 of greatest diameter communicates with the space 40. A spool 44 of differential outline works in the bore 42. The spring 12 acts on the inner end of the spool 44, which is of greater diameter, through an abutment plate 45 to urge the spool 44 relatively outwardly and into an advanced position. The outer end of the spool 44 carries a circlip 46 for engagement with the outer end of the housing 1 to limit movement of the spool 44 in an inwards direction.

The spool 44 carries first and second axially spaced seals 47 and 48 of elastomeric material. The first seal 47 is permanently disposed within a portion 49 of the bore 42 which is of smallest diameter, and the second seal 47, carried by the portion of greater, diameter is adapted to co-operate with a shoulder 50 at a step at the change in diameter between the portion 43 of greatest diameter and a portion 51 of intermediate diameter to isolate a radial passage 52, leading to the dump valve 4, from a bleed passage 53 to atmosphere. The bleed passage 53 is disposed between the two seals 47 and 48 and leads from the intermediate bore portion 51. The shoulder 50 is inclined or otherwise radiused to facilitate the sealing engagement with, and the sliding movement of, the second seal 48 into the portion 51 of intermediate diameter.

A friction device or detent 60 is provided to hold the spool 44 in the retracted position shown to enable bleeding of the system to be carried out on initial assembly of the hydraulic system in a vehicle.

The device 60 comprises a piston 61 carrying a fluid-tight seal 62 and working in a radial bore 63 in the wall of the housing 1. The piston 61 carries a stem 64 of reduced diameter, and the stem 64 projects through a portion of the bore 63 which is of reduced diameter to co-operate at its inner end with the spool 44.

In an advanced operative position shown in FIG. 3 of the drawings in which the piston 61 is assembled in the modulator assembly 2, the stem 64 is received in a radial groove 65 in the spool 44 with an inclined face 66 on the stem 62 being engaged by a complementary, similarly inclined, face 67 at the inner end of the groove 65. The face 66 terminates in a chamfer 68, with a complementary chamfer 69 being provided at the outer end of the bore 63. This holds the spool 44 in the retracted position to enable bleeding to be carried out with the ports 52 and 53 in communication.

The piston 61 is held in the advanced operative position by the friction between the seal 62 and the bore 63, and between the stem 64 and the spool 44.

When the system has been bleed initially, the pressure of hydraulic fluid applied to the space 40 acts on the diameter of the spool 44 which is defined by the seal 47, and over the effective area of the seal 62 and the inner end of the stem 64. When this pressure attains a predetermined value, the effective force acting on the piston 61 is sufficient to urge the piston 61 outwardly against the frictional engagement between the seal 62 and the bore 63, and between the faces 66 and 67, and withdraw the stem 64 from the groove. The final retracting movement of the piston 61 is enhanced by the ramp angle defined by the engagement of the chamfers 68 and 69 and the pressure acting in the spool 44. The spool 44 then automatically moves into the closed position in which the seal 48 isolates the port 53 from the port 52, by the pressure acting on the spool 44 and the force in the spring 12, and with the circlip 46 moving away from the housing 1. Specifically the seal 48 initially engages with the shoulder 50 to isolate the port 53 from the port 52, and subsequently rides up the shoulder 50 and into the intermediate bore portion 51 to enhance the sealing engagement.

A cover plate 70 for the dump valve 4 overlaps a portion of the outer end of the bore 63 to prevent accidental removal of the piston 61 from the bore 63.

The spool 44 can be urged inwardly against the load in the spring 12 to enable bleeding to be carried out manually, with movement of the spool 44 in such a direction being limited by the engagement of the circlip 46 with the housing which acts as a stop.

In such an event the friction device or detent 60 is inoperative and is held in its retracted position by the friction between the seal 62 and the bore 63.

I claim:

1. An hydraulic anti-skid braking system for vehicles comprising a vehicle brake, a supply for operating fluid for applying said brake, skid sensing means for sensing the pressure of skid conditions at said wheel during braking and thereupon to produce skid signals, a modulator assembly for modulating the supply of fluid from said supply to said brake in accordance with said skid signals, and an hydraulic pump for controlling brake re-application following correction of said skid, said pump incorporating at least one plunger and a working chamber associated with said plunger and in communication with said modulator assembly, wherein said modulator assembly comprises a housing having a bore, a de-boost piston working in said bore and movable between an advanced inoperative position and a retracted position, a control valve assembly with which said de-boost piston is adapted to co-operate and which is adapted to control communication between said brake and said supply, said control valve assembly being movable between an open position when said de-boost piston is in said advanced position and a closed position when said de-boost piston is in said retracted position, means defining a space in said bore in communication with said working chamber and in which fluid from said pump is adapted to be trapped to hold said de-boost piston in said inoperative advanced position, a bleed device communicating with said space and movable between an open position and a closed position, friction means for holding said bleed device in said open position during initial bleeding of said system, and pressure responsive means co-operating with said bleed device and responsive to fluid pressure in said system, said pressure-responsive means being adapted to overcome said friction means automatically to urge said bleed device into said closed position when said fluid pressure attains a predetermined value, and wherein said friction means comprises a pressure-responsive detent, and said pressure-responsive means comprises a pressure-responsive face on said detent which is responsive to pressure in the said space in communication with said working chamber, said detent being movable between an initial advance position to hold said bleed device in the open position and an inoperative retracted position which permits said bleed device to close automatically when the said pressure acting on said face attains the said predetermined value, means defining frictional engagement between said detent and said housing operative to hold said detent in said initial advanced position, said frictional engagements being overcome by a force to which said detent is subjected, which force comprises said pressure acting on said pressure-responsive face on said detent.

2. A braking system as claimed in claim 1, wherein said housing has a first longitudinally extending bore, a second bore normal to said first bore, a first port, and a second port, and said bleed device comprises a spool working in said first bore in said housing and movable between a first bleed position in which said first and second ports are in communication and a second closed position in which communication between said first and second ports is cut-off, said spool having a notch, said pressure-responsive detent comprising a piston working in said second bore in the housing and carrying a stem having a free end which is received in said notch in said spool to hold said spool in said first bleed position and from which said stem is releasable as said detent moves into the said retracted position.

3. A braking system as claimed in claim 2, wherein said stem has an inclined portion at said free end, and said inclined portion co-operates with a complementary inclined face at the inner end of said notch, whereby to provide a wedge action and facilitate withdrawal of said stem against frictional engagement between said inclined face and said notch.

4. A braking system as claimed in claim 3, wherein said free end of said stem has a chamfer.

5. A braking system as claimed in claim 3, wherein said notch comprises a radial groove in said spool.

6. A braking system as claimed in claim 2, wherein a cover plate for a dump valve retains said piston against accidental removal from said second bore.

* * * * *